United States Patent [19]

Hill

[11] 4,039,412
[45] Aug. 2, 1977

[54] PROCESS AND STRUCTURE FOR FIXATION OF ATMOSPHERIC NITROGEN

[76] Inventor: Robert Dickson Hill, P.O. Box 5484, Montecito, Calif. 93108

[21] Appl. No.: 598,931

[22] Filed: July 25, 1975

Related U.S. Application Data

[63] Continuation-in-part of Ser. No. 518,762, Oct. 29, 1974, abandoned.

[51] Int. Cl.² .......................... B01J 1/10; B01K 1/00
[52] U.S. Cl. ......................... 204/157.1 H; 250/527; 423/405
[58] Field of Search ............. 204/157.1 H; 250/527; 423/405

[56] References Cited

U.S. PATENT DOCUMENTS

| | | | |
|---|---|---|---|
| 2,898,277 | 8/1959 | Harteck et al. | 204/157.1 H |
| 2,992,980 | 7/1961 | Suttle | 250/527 |
| 3,117,068 | 1/1964 | Morrow et al. | 204/157.1 H |
| 3,453,196 | 7/1969 | Sporek | 204/157.1 H |

OTHER PUBLICATIONS

Martin, Chemical & Engineering News, vol. 33, No. 14, Apr. 4, 1955, p. 1424.

Primary Examiner—Howard S. Williams

[57] ABSTRACT

A process and structure are described for fixing atmospheric nitrogen to oxygen to produce oxides of nitrogen. Energy required for the conversion process is drawn from radiations produced by radioactive wastes from nuclear reactors. Preferably, two complementary stages are employed in the conversion process. First, waste heat from spent fuel rods is employed as a heat source for producing nitrogen oxides. Second, radioactive waste materials chemically separated from spent reactor fuel rods are employed in a second stage as an ionization source for producing nitrogen oxides.

12 Claims, 4 Drawing Figures gas flow

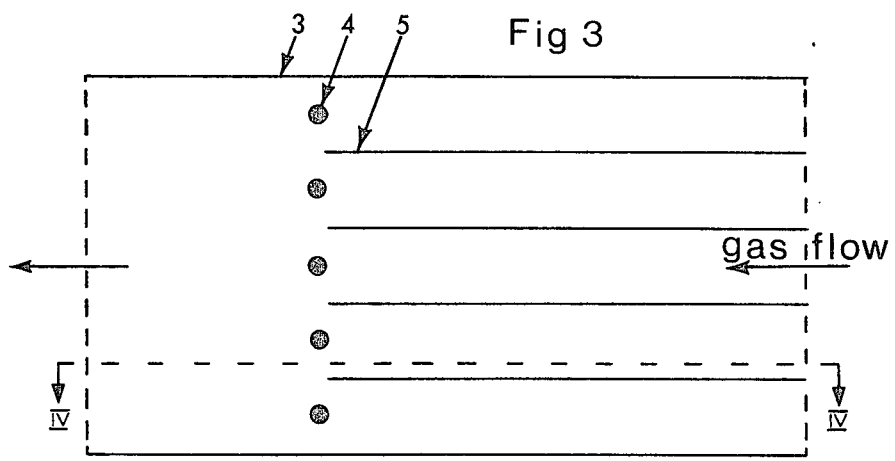
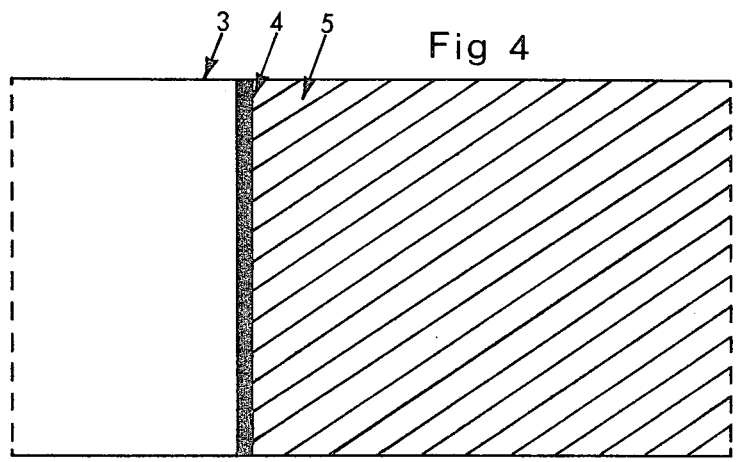

PROCESS AND STRUCTURE FOR FIXATION OF ATMOSPHERIC NITROGEN

PRIOR APPLICATION

This application is a continuation-in-part of an earlier filed application by the same inventor, application Ser. No. 518,762 filed Oct. 29 1974, now abandoned and titled "A Process and Structure For Fixation of Atmospheric Nitrogen".

BACKGROUND OF THE INVENTION

Processes for the fixation of nitrogen from the atmosphere are well known in industry. As discussed in a review by Jean L. Marx in Science, Vol. 185, pages 132–136, July 12, 1974, ammonia was first synthesized from nitrogen in the atmosphere by the Haber-Bosch process in 1913. With modifications, such as the Claude process invented in 1917, manufacturing of synthetic ammonia has continued up to the present day. Ammonia synthesis by such processes requires the expenditure of large amounts of energy, not only in order to produce the constituent hydrogen of the process but also to develop the high temperature and pressures required for the conversion of nitrogen and hydrogen to ammonia.

In another process, known as the Birkeland-Eyde process for the fixation of nitrogen through the production of NO, air is passed through an electric arc flame which produces an equilibrium concentration of NO in air at the high temperature of the flame. The NO is extracted in a series of cooling, absorption towers. Although the process using electric arcs has largely been discontinued, essentially the same method has been revived in which heating is provided by conventional methods and nitrogen and oxygen are partially converted to NO by passing the heated gases over a platinum catalyst.

Following the introduction of nuclear reactors into technology in the late 1940's it was realized that intense ionization and heat within a nuclear reactor could be employed for the generation of oxides of nitrogen from air. In 1956, Paul Harteck and Seymour Dondes disclosed in U.S. Pat. No. 2,898,277 a technique for producing oxides of nitrogen by using air flowing at high pressures through a reactor.

Similarly, in U.S. Pat. No. 3,298,920 issued to Marvin R. Gustavson, David R. Sawle and Arthur T. Biehl in 1967, a technique was disclosed for producing nitric acid by using a nuclear reactor. In the technique described by Gustavson et al., a fissionable material, in the form of an aerosol smoke, was mixed with air before circulation within the body of a nuclear reactor. Although the nitrogen-oxygen recombination process was essentially the same as in the Harteck-Dondes process, the advantage claimed for the Gustavson technique was that the gases were exposed to enhanced ionizations from the fission fragments recoiling from the fissionable aerosol. In the case of the Harteck-Dondes process, the major sources of ionization were the less-effective x-ray and gamma-ray electromagnetic radiations and the recoiling and disintegration particles arising from neutron interactions.

The present inventor, using theoretical analyses and digital computers, carried out extensive computations of a large number of possible chemical and ionic reactions between numerous species of neutral and ionized molecules and atoms produced when intense particle radiations ionize air. (See: Preliminary Report on Heating Processes in Intensely Ionized Air, by R. D. Hill, Report 1–93 Coordinated Science Laboratory, University of Illinois, 24 June 1960). In considering the results of these calculations, significant though small yields of the oxides of nitrogen were recognized to be produced by direct irradiation of ambient air with ionizing radiation in a manner similar to irradiation with reactor radiation, as was indicated in the patents just cited.

While such structures and interactions for the fixation of nitrogen using nuclear radiations have been known for some time, it is understandable, as pointed out by David R. Safrony in a recent article in Scientific American, Vol. 231, pages 64–80, Oct. 1974, that the so-called "chemonuclear" techniques have never met with significant usage. This is mainly for two reasons: first, that special nuclear reactor designs are required to ensure that a large proportion of fission-produced fragments interacts directly with the gas mixture (or air), and second, that almost complete decontamination of the gas mixture and nitrogen oxides from the highly radioactive products of uranium fission is required before the technique can be considered in any way radiologically acceptable.

BRIEF DESCRIPTION OF THE INVENTION

This invention employs reactor wastes, which now present serious handling and disposal problems, for fixing nitrogen from atmospheric gases. Briefly there are two complementary stages in the invention: (1) the waste heat in spent nuclear reactor fuel is employed as a heat-producing source of nitrogen oxides, and (2) radioactive waste materials chemically separated from processed reactor rods are employed in a second stage as an ionization-producing source of nitrogen oxides.

By following the instructions of this invention, significant yields of nitrogen oxides can be obtained at greatly reduced energy costs by employing otherwise un-utilized nuclear waste materials. Furthermore, there are other significant and desirable consequences ensuing from the use of nuclear waste materials. This invention, for example, provides a methodology for the control and storage of waste reactor materials. Not only will the process provide a profitable use of energy presently ignored but it will provide also the basis of a method for management control, protection and surveillance of these materials.

BRIEF DESCRIPTION OF THE DRAWINGS

The invention will be further described in connection with the accompanying drawings, in which:

FIG. 3 is a top view of a duct constructed in accordance with the principles of the second stage of ionization in the invention; and FIG. 4 is a side view taken along lines IV—IV of FIG. 3.

DETAILED DESCRIPTION OF THE INVENTION: FIRST STAGE

The invention employs nuclear reactor rods, and the waste products they contain, in two complementary stages: first the waste heat in spent nuclear reactor rods is employed as a heat producing source of nitrogen oxides, and second, the radioactive waste materials are separated from such rods and employed as an ionizing producing source of nitrogen oxides. While these stages are complementary they may be used in series and in either order in a single plant, or independently in separate plants, as preferred by the system designer. Accordingly, each stage will be described independent of the other.

Figure 1:
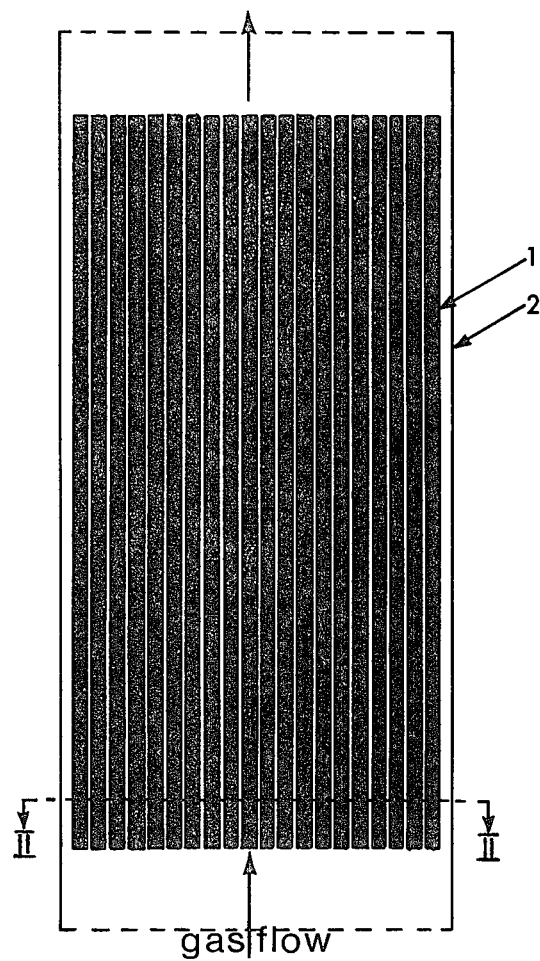
FIG. 1 is a side view in section of the air heater constructed in accordance with the principles of the first stage of the present invention.
Figure 2:
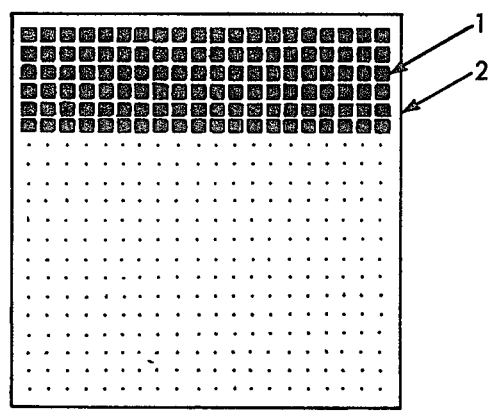
FIG. 2 is a section view taken along line II—II of FIG. 1.

In the first stage, spent nuclear reactor fuel rods upon being removed from a shutdown nuclear reactor are reassembled in a lattice of bundles of reactor rods such as shown in FIG. 1 and 2. Nuclear reactor practice requires that a certain fraction of bundles of reactor rods should be replaced when optimum amounts of fissionable fuel have been burned in the rods. At such times, the rods are exceedingly radioactive. It is the present practice to store these rods for a long cooling-off period in a shielded, water-filled trench. It is during this time that the invention employs the rods as a profitable heat-energy source for the production of nitrogen oxides.

Because reactor rods must be designed with a cladding material to cover the internal fissionable material, and because this cladding must maintain its integrity throughout the reactor operation, such rods automatically meet the condition that no radioactivity accompanies production of NO in the nitrogen fixation plant and process herein described.

Furthermore, because the fuel rods are fabricated from a dense, high atomic number, fissionable material (such as uranium oxide), and because the cladding is usually a metal (such as zircaloy or stainless steel), the rods are effective absorbers of radioactive particle emissions (such as beta rays, alpha particles, delta rays, etc.). They are therefore the source of strong heating produced by the stopping of these energetic emissions. The way in which x- and γ- rays also contribute to heating will be discussed later.

In the stage before chemical processing of the rods, therefore, the invention employs the rods as a source of heating of the atmospheric gases. It is well known when air is raised to temperatures of the order of 1300° K that nitric oxide is produced in significant amounts according to the following reactions:

$$N_2 + O_2 \rightleftarrows 2NO$$
$$N + O \rightleftarrows NO \quad (1)$$

Theoretical calculations of the abundance of different species in heated air have been made by the following experts, among others: F. R. Gilmore, in the RAND Corporation report RM-1543, August 1955; J. Hilsenrath and C. W. Beckett, in the National Bureau of Standards report 3991, April 1955; and D. G. Clifton, in the General Motors Corporation report TR66-01N, August 1966. All of these calculations are in essential agreement in indicating, for example, that in raising the temperature of air from 300° K to 1300° K the amount of NO in thermodynamic equilibrium in air at 1 atmosphere pressure increases from essentially zero to $2.4 \times 10^{15}$ molecules per cm$^3$.

The amounts of heat that could be made available from reactor rods removed from a reactor after approximately 300 days of full reactor power operation can be estimated from Merrill Eisenbud's book entitled *Environmental Radioactivity* (McGraw-Hill, N.Y., 1962) p.212. For the purpose of orientation, all 400 bundles of reactor rods in a 3000 Megawatt reactor core are assumed to be removed from the reactor and employed in the process and plant being described. These bundles preferably are reassembled in a closely spaced lattice of 20 rows each containing 20 bundles. In order to prevent any chance of the reassembled rods approaching reactor criticality there ae interspersed throughout the bundles, rods of cadmium or other strongly absorbing neutron materials, in sufficient amounts to prevent fission multiplication, at least of an unmanageable degree.

In the separate lattice bundles there may be many reactor rods. For example, in one typical design there are 7 rows each containing 7 rods. The individual reactor rods in the bundle are 12 feet long, 4/10 inch in diameter, and spaced 2/10 inch from adjacent rods in a regular square lattice. Such an assembly of rods and bundles presents a considerable impediment to the escape of x- and γ-rays emitted by the fuel elements and waste radioactive materials. Moreover, by surrounding the whole lattice of bundles by a few centimeters of a γ-ray absorbing shield, it is estimated that at least 80 percent, or more, of the energy emitted as waste radioactive energy will be available as a heat source for producing nitrogen oxides.

Because the activity residing in the rods declines after the rods are removed from a working reactor, the amount of heat available for a nitrogen fixation plant will diminish with time according to the data given in Table I.

Table I

| Waste Heat From 3000 Megawatt Reactor Core | | | | |
|---|---|---|---|---|
| Time Delay (Days) | 1 | 10 | 100 | 1000 |
| Heat Available (80%) (Joules per second) | $1.1 \times 10^7$ | $5.7 \times 10^6$ | $1.4 \times 10^6$ | $1.4 \times 10^5$ |

In the reactor-rod heater shown in FIGS. 1 and 2, air is forced to flow along and between the heater bundles and rods 1 contained in a heat-insulated vessel 2. In the process of passing along the spaces between the rods, the air is heated by contact with the rods, by absorption of radioactive radiations such as beta particles and gamma rays emitted by the fuel elements and the waste materials in the rods.

The allowable temperatures of the rods will be governed by design and safety considerations of the rods themselves. The flow of air must be such as to maintain the rods at or below the safe temperature that guarantees the radioactive integrity of the rods and their cladding. For this reason the waste reactor heater, i.e. FIG. 1, is best envisaged as a pre-heater in which the temperature is raised to an intermediate temperature in the range from ambient, say 300° K, up to, say, approximately 800° K, which is the maximum temperature in some existing-design rods that guarantees integrity of rods and cladding. It is also expected that other contributions towards pre-heating of the air will also be used. These will be discussed later. Following the reactor rod heater will be a conventional-type heater, which will then raise the air temperature up to approximately 1300° K at which value the production of NO in thermodynamic equilibrium is sufficient to achieve a reasonable efficiency for commercial nitrogen oxide production.

After being raised to a temperature of the order of 1300° K, the air which now contains of the order of a percent of nitrogen oxide, must be quickly quenched to a lower temperature of the order of 900° K in order that the NO molecules will not convert back into nitrogen and oxygen. One method for achieving rapid cooling or quenching is to use a sudden expansion of the gas as provided by a Laval nozzle. Such a method is preferred. Accordingly, during heating of the air, its pressure is also raised to permit such a rapid quenching by sudden expansion to a lower pressure.

The air entering both the pre-heating nuclear waste heater and the conventional heater must therefore be initially compressed. Compression on the inlet sides of the heaters is also required for circulation of the air. Any heating resulting from compression of the air is useful in preheating the gas. Furthermore, any heat extracted from the gas emerging from the heaters, after the Laval nozzles and before passing into the NO extraction plant, can also be employed for preheating the air before entering the nuclear waste heater and/or the conventional heater.

Processes for the extraction of NO from the air are well known to those practiced in the art. These processes include, for example, the flowing of the cooled air containing NO along an oxidation tower which tends to convert the NO to $NO_2$. The $NO_2$-containing air is then led along absorbing towers containing water, thereby converting the $NO_2$ gas into a mixture of nitric and nitrous acid. Any unconverted NO can also be absorbed in towers containing sodium carbonate. The processes for extracting NO in air are well established. Such processes are described in the cited publications, for examaple: Industrial and Engineering Chemistry, by Nathan Gilbert and Farrington Daniels, Vol. 40, pages 1719–1723, Sept. 1948; and *Mellor's Modern Industrial Chemistry*, Edited by G. D. Parkes, in collaboration with J. W. Mellor (Longmans-Green and Co., London, 1939) p.406.

The throughput of an NO plante relying on the heating of air depends only on the total amount of heating energy that can be applied to the air to raise its temperature to one of the order of 1000° C. The usefulness of reactor-waste heating depends on that fraction of the required heat which is provided by the reactor rods. For a given plant design the higher the NO throughput, the lower will be the contribution of nuclear waste heat and the lower will be the temperature provided by the nuclear furnace to the pre-heating of the air.

Probably the best measure of the nuclear waste heating contribution is provided by the anticipated energy contribution to the fixation process, in kilowatt hours, as a function of the time the rods have operated in the NO nuclear furnace. These values are given in Table II. It is apparent there that nuclear-reactor heating could provide significant cost savings.

Table II

| Waste Energy From 3000 Megawatt Reactor (80% Availability) | | | |
|---|---|---|---|
| Elapsed Time (Days) | 1 to 10 | 1 to 100 | 1 to 500 |
| Energy Expended (kWhr) | $2 \times 10^6$ | $5.7 \times 10^7$ | $1.1 \times 10^8$ |
| Cost Saving (at 3 cents p.kWhr) | $30,000 | $170,000 | $440,000 |

For an accurate comparison of costs with other fixation methods it is also required to deduct from the nuclear waste heating method the costs of storing spent nuclear reactor fuel rods, since the invented methods will realize this cost saving as well. Clearly, the first stage of this invention just described is eminently practical, even considered alone.

DETAILED DESCRIPTION OF THE INVENTION: SECOND STAGE

Referring to FIG. 3, a schematic drawing of an irradiating unit of a fixation plant, a metal air-tight duct 3 is provided with a grill of rods which produce intense ionization because they are highly radioactive. Preferably these ionizing rods are formed so as to have high concentrations of extracted, waste reactor, radioactive atoms on their surfaces (for reasons which will be discussed) and are oriented in vertical positions so as to facilitate remote emplacement and retrieval. The structure of the rods will be discussed in further detail later.

At the inlet of the duct, air or any other mixture of nitrogen and oxygen is forced by a pump (not shown) to flow along the duct between parallel plate guides 5 which extend almost to the radioactive ionizing rods. The purpose of these guides is to prevent lateral motion and turbulence of the gas flow by the rods, i.e. to achieve essentially laminar flow.

After passing the ionizing rods, the irradiated gas mixture will contain a small but significant amount of nitrogen oxides, as will be explained. This gas mixture flows to an outlet where the nitrogen oxides may be removed from unconverted gases by conventional extraction procedures, such as condensation of nitrogen oxides by cooling, and other processes which are well known to those skilled in the art. Such processes are described in the publications already cited, for example: in U.S. Pat. No. 2,898,277 by Paul Harteck and Seymour Dondes, and in Industrial and Engineering Chemistry, by Nathan Gilbert and Farrington Daniels, Vol. 40, pages 1719–1723, Sept. 1948.

Although the complex of inter-related processes occurring in the irradiated gas only can be followed by using high-speed digital computers, the following simplified version of what is occurring can be used to obtain estimates of the concentration of NO molecules produced in the process.

Because of the high concentrations of $N_2$ and $O_2$ molecules in the gas, the main ionization processes may be represented by the following reactions:

 (2)

R represents an ionizing agent, such as a beta ray, a γ-ray photon, or a low energy electron (delta ray); e⁻ indicates an electron that has been removed from a neutral molecule; and β is an ionization rate constant measured in inverse seconds, i.e. β ($N_2 + O_2$) represents the rate of ionization per cm³ per second, where ($N_2 + O_2$) indicates the neutral molecular concentration in the gas. (There are, of course, many other types of ionization which, however, are not given here because of the simplification used.

Again, because of the high concentrations of $N_2$ and $O_2$, the most reactive processes involving $N_2^+$ and $O_2^+$ are the following conversion processes:

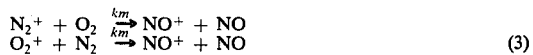 (3)

where $k_m$ is a reaction rate constant approximately equal to $8 \times 10^{-10}$ cm³/sec. In computer analysis it is found that NO⁺ rapidly becomes the most dominant positive ion through reactions (3), and the neutral molecule NO is also one of the most abundant neutral species produced.

The NO⁺ concentration is found mainly to be limited by the reaction:

 (4)

where the recombination coefficient $\alpha$ has an approximate value of $5\times10^{-8}$ cm$^3$/sec. However, the NO concentration is not so strongly limited and, in fact, the most reactive process given in Eq(5) below is considerably slower than Eq(4).

$$NO + N \xrightarrow{X_2} N_2 + O \tag{5}$$

Reaction rate constant $X_2$ is approximately equal to $5\times10^{-13}$ cm$^3$/sec.

In considering the concentration changes of NO, therefore, we can simplify the equation to a difference between the production rate via Eq(3) but determined by the supply of $N_2^+$ and $O_2^+$ from Eq(2), and a depletion rate determined by Eq(5). Thus the differential equation is:

$$d(NO)/dt = \beta(M) - X_2(NO)(N) \tag{6}$$

where (M) is used to denote the concentration of neutral $N_2 + O_2$.

In practice, from computer analyses of these simultaneous reactions, it has been found that the N and NO concentrations are approximately equal. If the further simplification just mentioned is assumed, then Eq(6) easily can be solved. The solution for the concentration of NO as a function of time t is:

$$(NO) = \frac{\sqrt{\beta(M)/X_2}\left(\exp\left(\sqrt{\beta(M)\,X_2 t}\right) - 1\right)}{\left(\exp\left(2\sqrt{\beta(M)\,X_2 t}\right) + 1\right)} \tag{7}$$

In the preferred embodiment of the second stage invention, the radioactive source is formed from radioactive wastes which, for the most part, are otherwise considered useless. To date, these highly intense radioactive wastes are merely laid waste. Their ultimate disposable presents a serious problem. (See: Radioactive Waste Storage, by Isaac J. Winograd, in Transactions Geophysical Union, Vol. 55, pages 884–894, October 1974).

Consistent with other constraints, such as the cost of purification, fabrication and the total emission of radiation energy, etc., the most important property of an ionizing source preferred for the process disclosed herein is that of processing as high a specific activity as possible.

It is well known in the science of radioactivity that the highest specific ionization, i.e. the greatest number of ion pairs per unit length of path of the ionizing agent traveling in the gas, is produced by a particle-type of radiation. Alpha particles, beta particles, and secondary electrons are examples of particle-type radiations. In reactor wastes, as stated by Isaac J. Winograd in the cited article, there are radioactive atoms that emit alpha particles, others that emit beta particles, and generaly most radioactive atoms emit x-rays and gamma rays which in turn create secondary electrons.

It is also well known in the science of radiation physics that particle radiations are relatively easily absorbed by solid material layers that may overlie the radioactive particle emitting atoms or may be mixed with the radioactive atoms themselves. It is therefore preferred in the second stage embodiment that the radioactive material of the ionizing rods 4 be overlaid with as thin protective layers as possible and be of as high specific concentration as possible. Because it is essential that none of the radioactive material of an ionizing rod should become dislodged from it and thereby cause contamination of the gas mixture in the duct, it is required that the radioactive atoms must be either intimately attached to the rod, e.g. either by chemical or electrolytic plating action, or the radioactive material must be retained by thin impervious covers, e.g. thin protective layer milar foils, which prevent escape of radioactive material while allowing penetration of particle radiation. In any case, considerable flexibility of design of the rods is possible and various different constructions may be preferred by those skilled in the art. Efficient trade-offs between reduction in the average energies of the emergent particle radiations and the total intensities of the emergent particle radiations can be realized. The average specific ionization, $\theta$, of the particle radiations emerging from the surface of an ionizing rod depends on the weighted average energy, $\overline{E}$, of the initial energies of the particles emitted by the radioactive atoms and the mass per unit area, m, or the radioactive waste product distributed in the surface layer of the rod. Thus $\theta$ will be a function $\theta(\overline{E}, m)$ of $\overline{E}$ and m.

In order to explain and predict the ionizing capability of a radioactivity rod it is required to specify the following characteristics of the radioactive material layer: (1) the average decay rate, $\lambda$, of the radioactive species contained in the layer, (2) the total effective number, $\phi$, of radioactive atoms (emitting particle radiations) per unit area of the layer or rod surface area, (3) the specific ionization function, $\theta(\overline{E},m)$. The value of $\beta$, the ionization rate in the gas mixture near the surface of the rod is given by the relationship:

$$\beta \approx \theta\lambda\phi/(N_2 + O_2) \tag{8}$$

Although estimates of $\beta$ will vary according to the particular design of the radioactive rod, the following values of the parameters in formula (8) are reasonable and attainable using available reactor-waste products and a surface-layer rod construction described herein: $\theta \simeq 10^3$ ion pairs per cm per radiation particle, $\lambda \simeq 1$ year$^{-1}$, $\phi \simeq 3 \times 10^{20}$ radioactive atoms per cm$^2$ within 0.1 to 1mm of the rod surface. (This value of $\phi$ corresponds to approximately ten percent of the total number of atoms in the surface layer being of a typical radioactive fission product.) Inserting these values of $\theta$, $\lambda$ and $\phi$ into formula (8) gives a value of $\beta$ for ambient air equal to $3.6 \times 10^{-4}$ sec$^{-1}$. This value of $\beta$ is probably low, not only because the values of $\theta$ and $\phi$ have been chosen conservatively but also because other radiations such as x- and gamma rays from the source will add to the ionization in the air surrounding the rods.

For an ionization rate $\beta$ of $3.6 \times 10^{-4}$ sec$^{-1}$ and and ambient air pressure surrounding the ionization rods, the equilibrium NO molecular concentration according to Eq(7) is $1.4 \times 10^{14}$ per cm$^3$. At an air pressure of 100 atmospheres, which is preferred for reducing the range of the beta particles emitted by the radioactive waste products to approximately the separation between rods, the value of $\theta$ in Eq(8) would be increased by a factor of 100. The value of $\beta$ $(N_2 + O_2)$ would therefore be increased by 100 and the concentration of NO in Eq(7) would be increased by a factor of 10. At 100 atmospheres, therefore, the NO concentration would accordingly be equal to $1.4 \times 10^{15}$ molecules per cm$^3$.

Another important aspect of this invention is the realization that the NO concentration is a saturation value, reached in a dynamic equilibrium time. From Eq(7) it is seen that the NO concentration tends to a saturation value of $\sqrt{\beta(M)/X_2}$ in a time of the order of $1/\sqrt{\beta(M).X_2}$. Thus substituting the values: $\beta = 3.6 \times 10^{-4}(\sec^1)$, $(M) = 2.7 \times 10^{21} (\text{cm}^{-3})$, $X_2 = 5 \times 10^{-13}$ $(\text{cm}^3 \sec^{-1})$, in the time formula gives the value of approximately 1.4 milliseconds for the equilibrium time. There is therefore no purpose to be gained in detaining the gas mixture in the vicinity of the intense ionization for times longer than the equilibrium time in the expectation that the NO concentration will be increased. The diameters of the rods, $d$, to which the sizes of the ionization regions are obviously related, and the velocity, $v$, of the air flow in the duct past the rods are therefore optimized to the equilibrium time, $t$, according to a formula such as the following:

$$d \simeq vt/x \qquad (9)$$

where $x$ is a small, geometrical, number factor representing the fractional increase in the width of the effective ionization region over and above the diameter of the rod.

Considerable latitude is available in designing the shape of the radioactive ionizing rods. In the embodiment illustrated in FIG. 3 the rods 4 are shown as having circular cross-sections. In that case the particle radiations diverge with approximately cylindrical symmetry from the rods and the factor $x$ is greater than unity. The ionization density in that case is also not constant with radial distance from the rods. In another variant of the rod design, the rod will have a rectangular cross-section and the radioactive material will be layered only on the sides between rods. In this variant the ionization density is reasonably constant between rods and the value of $x$ is more nearly unity. In any case, for the purpose of illustration, the value of $x$ can be assumed to be unity.

As an illustration of the factors involved in this optimization we describe the following embodiment: an air duct flow rate of 1000 cubic feet per minute equivalent to a metric flow rate of approximately $5 \times 10^5 \text{cm}^3$ per second; an air duct cross-section of 31.5 cm by 31.5 cm, i.e. a cross-sectional area of $10^3 \text{cm}^2$; an air flow velocity at the rod, or grill, section of 500 cm per second; an optimized rod diameter, obtained from Eq(8) for an equilibration time of the order of $2 \times 10^{-3}$ seconds, equal to 1 cm. Accordingly, with a total flow rate of air equal to $5 \times 10^5 \text{cm}^3$ per second, and with each cubic centimeter of the irradiated air mixture at a pressure of 100 atmospheres containing a concentration of $1.4 \times 10^{15}$ molecules of NO, the total production of NO per fixation unit is $7 \times 10^{20}$ molecules per second or approximately 33.5 milligrams aof NO per second. Per day, therefore, the production rate of a single duct is 3000 gm of NO. Deployment of a large number of units certainly appears to be practical. If 1000 units of these second stage units operated, the production rate would be increased to 3000 kgm per day, or 3 metric tons per day, and this production could be continued for many years, as determined by the average lifetime of the radioactive waste products.

Other embodiments and variations of this invention will be apparent to, and may be preferred to, those skilled in the art. Accordingly, the scope of the invention is set forth in the following claims.

I claim:

1. A process for fixing nitrogen and oxygen, as in air, to obtain oxides of nitrogen, employing heat generated by spent nuclear reactor rods, the said process relying on an assembly of spent reactor rods arranged in a closely spaced manner so as to confine the heat generated in the rods by the nuclear reactions still occurring in the rods even though the said rods have been removed from the reactor in which they were originally activated, the said process further employing a mixture of nitrogen and oxygen which is forced to flow through said assembly of spent reactor rods at such a rate as to achieve a substantial heating and consequent temperature rise of the mixture, the said heating and temperature rise producing oxides of nitrogen which are in thermodynamic equilibrium with the constituents and which in the final stage of the process are separated from the mixture.

2. A process as set forth in claim 1, including: a further heating of the mixture after passage through the assembly of spent reactor rods in order to increase the temperature of the mixture and the amounts of nitrogen oxides in thermodynamic equilibrium in the mixture, and a subsequent quenching of the heated mixture in order to prevent substantial reconversion of nitrogen oxides back into their constituents prior to separating nitrogen oxides in the final stages of the process as in claim 1.

3. A process as set forth in claim 2, wherein the mixture in the assembly of spent reactor rods is raised to a temperature intermediate between ambient and 1300° K, which intermediate temperature is lower than the safemargin temperature of the rods, and to a temperature of the order of 1300° K by a further heating step, then quenched to a temperature at which the fixation process is not strongly reversed.

4. A structure for fixing nitrogen and oxygen in a mixture, as in air, to obtain oxides of nitrogen employing spent nuclear reactor rods, the said structure including an assembly of spent nuclear rods spaced sufficiently closely so as to confine the heat generated by the continuing nuclear and fissioning reactions occurring in the rods even though the said rods were removed from their original nuclear reactor, the said structure having means for flowing a mixture of nitrogen and oxygen through the assembly at a rate sufficient to achieve substantial heating and temperature rise of the mixture, the heating and temperature rise producing oxides of nitrogen, and the said structure having means for separating the oxide of nitrogen from the mixture.

5. A structure as set forth in 4 wherein said structure includes means for further heating the mixture after passage through the assmbly of spent reactor rods in order to increase production of oxides of nitrogen in the mixture, and the said structure having means for quenching the heated mixture in order to prevent substantial reconversion of the oxides of nitrogen to nitrogen and oxygen constituents prior to separating the oxides of nitrogen.

6. A process for fixing nitrogen and oxygen, as in air, to obtain oxides of nitrogen, comprising: providing a mixture of oxygen and nitrogen, subjecting the mixture to radiations of charged-particles and electromagnetic energy from nuclear waste materials for the purpose of ionizing atoms and molecules of the mixture without radioactivating atomic nuclei of the mixture, and thereafter separating the nitrogen oxides from the mixture.

7. A process as set forth in 6, in which the mixture remains in the ionization region for a period of time sufficient to build up a near-equilibrium concentration of nitrogen oxides, the said concentration being determined by the time-rate of production of the ionization density of the mixture, and thereafter separating the nitrogen oxides from the mixture.

8. A structure for fixing nitrogen and oxygen, as in air, to obtain oxides of nitrogen, the said structure including means: of providing a mixture of oxygen and nitrogen, of providing a nuclear waste material radioactive source, of producing and controlling the flow-rate of the mixture, and of separating the oxides of nitrogen from the mixture.

9. A structure for fixing nitrogen and oxygen, as in air, to obtain oxides of nitrogen, the said structure providing: means of supplying a mixture of nitrogen and oxygen, means of producing a high density of ionization in a part of the said mixture, means of producing a rapid flow of the said part of the mixture into and out of the region of high ionization density, means of regulating the occupation time of the said part of the mixture in the region of high ionization density to an exceedingly short optimum time, and means for separating the oxides of nitrogen from the mixture.

10. A structure as in 9 in which the means of producing a high density of ionization is a nuclear-reactor waste material.

11. A structure as in 9 in which the means of regulating the occupation time of part of the mixture in the region of high ionization density to an exceedingly short optimum time comprises a narrow region of high ionization density and a rapid, controllable flow of mixture across the said narrow region.

12. A structure as in 11 in which the exceedingly short optimum occupation time in the region of high ionization density is of the order of a few milliseconds.

* * * * *